United States Patent [19]

Moriizumi

[11] Patent Number: 5,187,736
[45] Date of Patent: Feb. 16, 1993

[54] TELEPHONE DATA COMMUNICATION SWITCHING SYSTEM

[75] Inventor: Kazuhiro Moriizumi, Atsugi, Japan

[73] Assignee: Ricoh Company, Ltd., Tokyo, Japan

[21] Appl. No.: 776,884

[22] Filed: Oct. 17, 1991

Related U.S. Application Data

[63] Continuation of Ser. No. 267,291, Nov. 4, 1988, abandoned.

[30] Foreign Application Priority Data

Nov. 4, 1987 [JP] Japan ................................ 62-280238
Feb. 8, 1988 [JP] Japan ................................ 63-28383

[51] Int. Cl.$^5$ .................................... H04M 11/00
[52] U.S. Cl. ............................. 379/100; 358/434
[58] Field of Search ............................ 379/93, 96–98, 379/100, 106, 157, 215, 442, 160, 161, 164, 168, 201, 209, 208, 179; 358/441, 437, 439, 434

[56] References Cited

U.S. PATENT DOCUMENTS

| | | | |
|---|---|---|---|
| 4,353,097 | 10/1982 | Takeda et al. | 379/100 |
| 4,727,576 | 4/1988 | Yoshida | 358/257 |
| 4,773,080 | 9/1988 | Nakajima et al. | 379/100 |
| 4,821,312 | 4/1989 | Horton et al. | 379/93 |
| 4,837,813 | 6/1989 | Terajima | 379/100 |
| 4,916,607 | 4/1990 | Teraichi et al. | 379/100 |

FOREIGN PATENT DOCUMENTS 0310001 4/1989 European Pat. Off. .
60-90460 5/1985 Japan ................................ 379/106
0230568 10/1986 Japan .
0120776 6/1987 Japan .
0146044 6/1987 Japan ................................ 379/100
0178065 8/1987 Japan .
0284571 12/1987 Japan .
0042266 2/1988 Japan ................................ 379/100
0232560 9/1988 Japan ................................ 379/100

Primary Examiner—James L. Dwyer
Assistant Examiner—Wing F. Chan
Attorney, Agent, or Firm—Oblon, Spivak, McClelland, Maier & Neustadt

[57] ABSTRACT

A hybrid communication system includes a telephone unit and a host communication apparatus, such as a facsimile machine, either of which is selectively connected to a common external transmission line which in turn is connected to a telephone network. When a request for conversation has been received while the host apparatus was in communication operation, a call signal is supplied to the telephone unit automatically upon completion of the current communication operation to produce a ringing sound. When an operator picked up the handset of the telephone unit in order to use it for conversation but could not use it because the host apparatus was in communication operation, upon completion of the current communication operation by the host apparatus, a call signal is automatically supplied to the telephone unit to produce a ringing sound to apprise the operator of the fact that the telephone unit is now available.

2 Claims, 6 Drawing Sheets

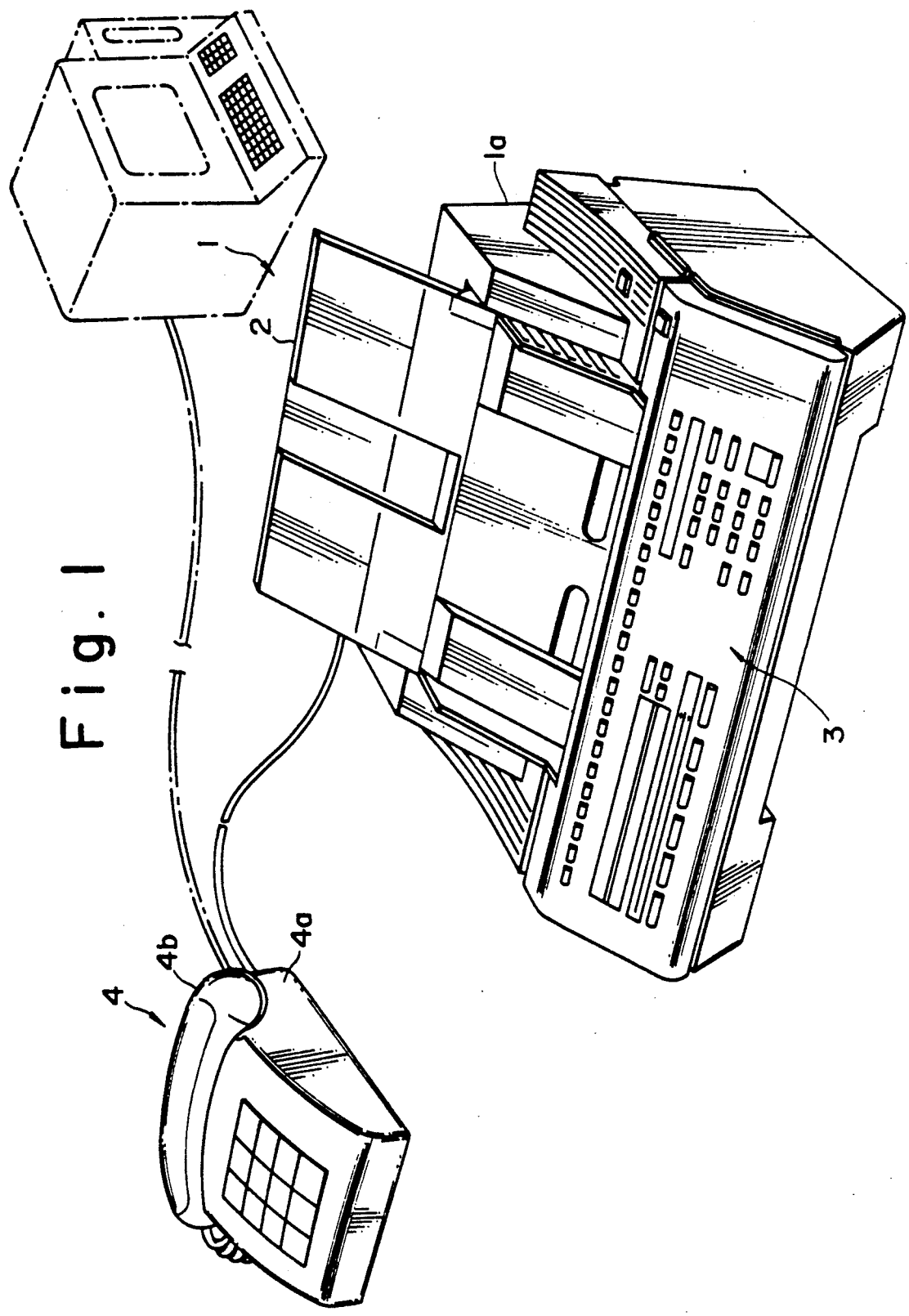
Fig. I

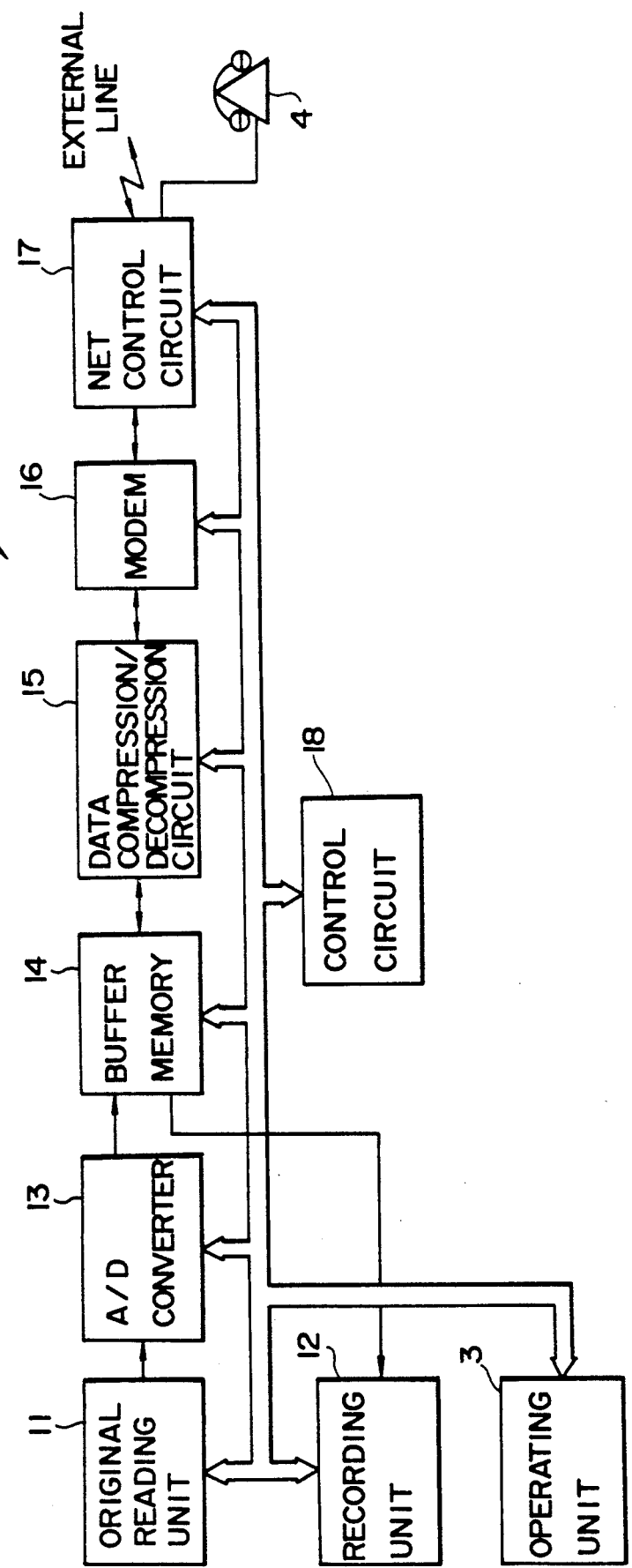

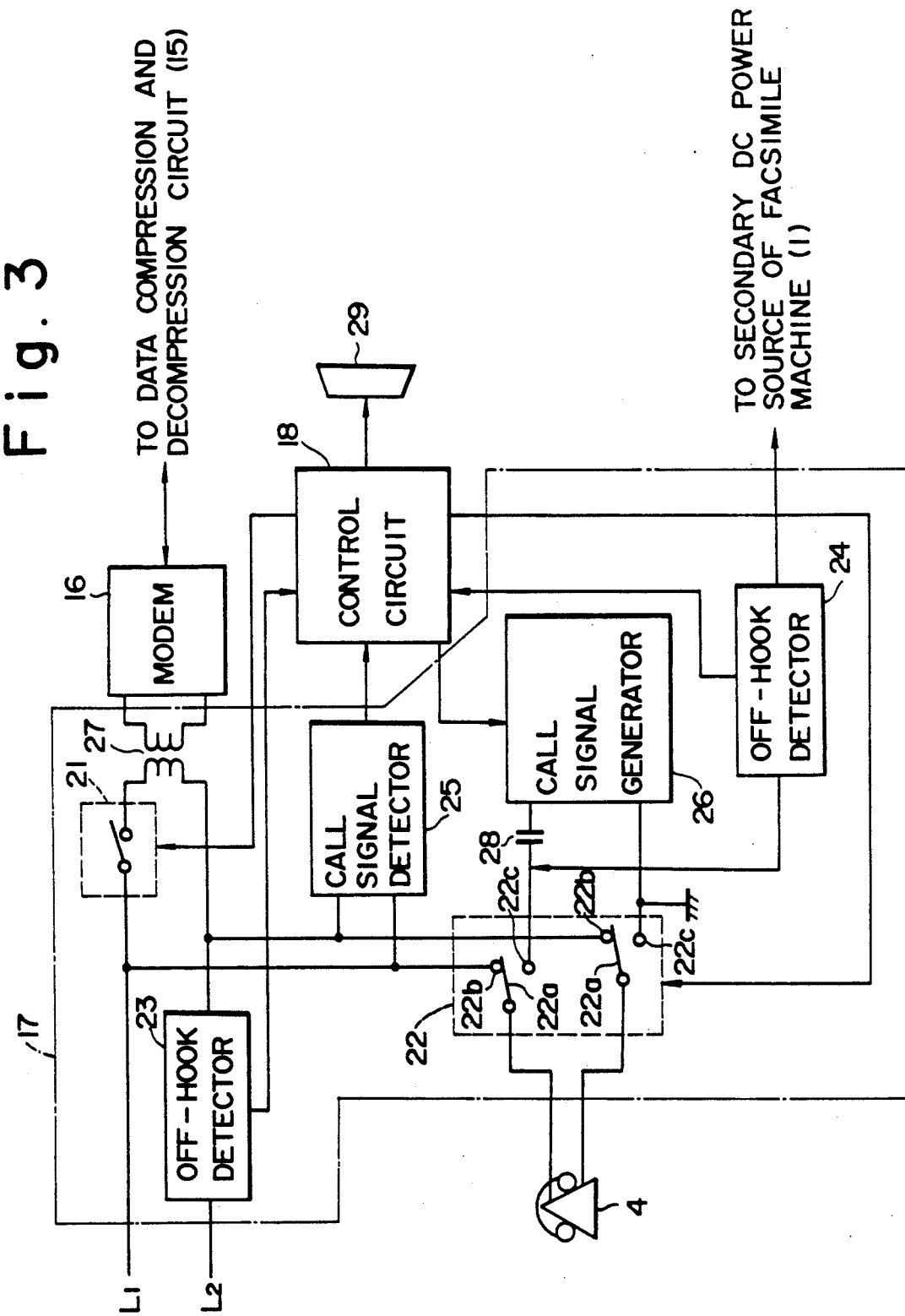

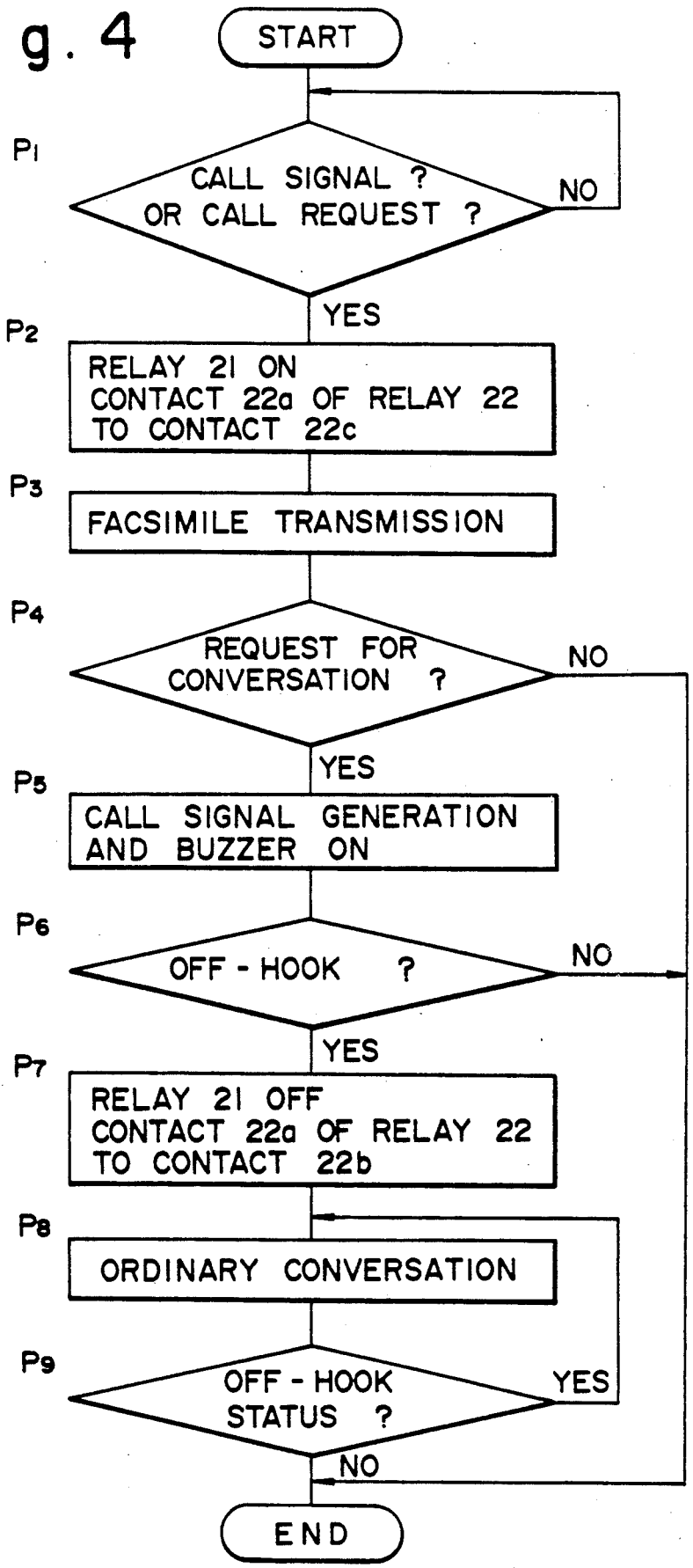

TELEPHONE DATA COMMUNICATION SWITCHING SYSTEM

This application is a continuation of application Ser. No. 07/267,291, filed on Nov. 4, 1988, now abandoned.

BACKGROUND OF THE INVENTION

1. Field of the Invention

This invention generally relates to a communication control system, and, in particular, to such a communication control system including a telephone unit and a data communication apparatus which are switchingly used for communication via a common transmission line connected to the communication control system.

2. Description of the Prior Art

In the recent information-oriented society, facsimile machines are widely used and many personal computers having a communication function are available. In such data communication apparatuses as facsimile machines and personal computers having a data communication function, data is typically transmitted using a telephone network. If the frequency of use of such a data communication apparatus is not so great, the telephone transmission line which has already been installed is often used also for such a data communication apparatus, and for this purpose a switching device is provided for switching a connection to the telephone transmission line between a telephone unit and a data communication apparatus, such as a facsimile machine. In such a case, the telephone unit is typically placed on a most convenient place, such as on a desk or on a wall; on the other hand, the data communication apparatus is located at such a place where an operator can use the apparatus most conveniently and where there is enough space for installation of such an apparatus, such as in a room or office. As a result, it is often the case that the telephone unit and the data communication apparatus are located at remote places, though they are connected to a common switching device since they both use the same telephone transmission line for communication. Since both of the telephone unit and the data communication apparatus are connected to the common switching device which in turn is connected to a single transmission line connected to a telephone network, they must be switchingly connected to the transmission line through the switching device.

Recent data communication apparatuses are often so structured that they can accept a request for conversation sent from another data communication apparatus at a remote place even in the process of data communication and upon completion of data communication a buzzer mounted in the data communication apparatus is activated to give an audio warning to the operator. Thus, the operator comes to know that a request for conversation has been received by this audio warning and then picks up the handset of the telephone unit to initiate telephone conversation with a caller.

In such a prior art structure, however, since the buzzer is mounted in the data communication apparatus, the activation of the buzzer may not be noticed by the operator This is likely because the data communication apparatus is often located in such a place where people do not stay long; on the other hand, the telephone unit is usually located at a place where ringing can be heard by most of the people concerned. Thus, in accordance with the above-described prior art structure, even if there has been a request for conversation, there is a chance that such a request be neglected.

SUMMARY OF THE INVENTION

In accordance with one aspect of the present invention, there is provided a communication control system in which, after receipt of image information accompanied by a request for conversation from a transmitter at a remote place, a calling signal is automatically sent to the telephone unit upon completion of reception of the image information.

In accordance with another aspect of the present invention, there is provided a communication control system in which, if a data communication apparatus is in communication operation when the handset of a telephone unit is picked up, a calling signal is automatically sent to the telephone unit upon completion of communication operation of the data communication apparatus.

It is therefore a primary object of the present invention to obviate the disadvantages of the prior art as described above and to provide an improved communication control system and method.

Another object of the present invention is to provide an improved communication control system which controls a connection of a telephone unit and a data communication apparatus, such as a facsimile machine, to a common transmission line.

A further object of the present invention is to provide an improved communication control system capable of sending a calling signal to an associated telephone unit automatically upon completion of communication of an associated data communication apparatus if a request for conversation has been received during communication.

A still further object of the present invention is to provide an improved communication control system capable of sending a calling signal to an associated telephone unit automatically upon completion of communication of an associated data communication apparatus if the handset of the associated telephone unit has been picked up during communication.

A still further object of the present invention is to provide an improved communication control system including a telephone unit and a data communication apparatus which may be located at remote places from each other.

Other objects, advantages and novel features of the present invention will become apparent from the following detailed description of the invention when considered in conjunction with the accompanying drawings.

BRIEF DESCRIPTION OF THE DRAWINGS

FIG. 1 is a schematic illustration showing a communication control system including a telephone unit and a facsimile machine constructed in accordance with one embodiment of the present invention;

FIG. 2 is a block diagram showing the internal electrical structure of the facsimile machine of the communication control system of FIG. 1;

FIG. 3 is a block diagram showing the detailed structure of the net control circuit and the control circuit of the structure shown in FIG. 2;

FIG. 4 is a flow chart showing a sequence of steps of a process for handling a request for conversation;

DESCRIPTION OF THE PREFERRED EMBODIMENTS

Figure 5A:
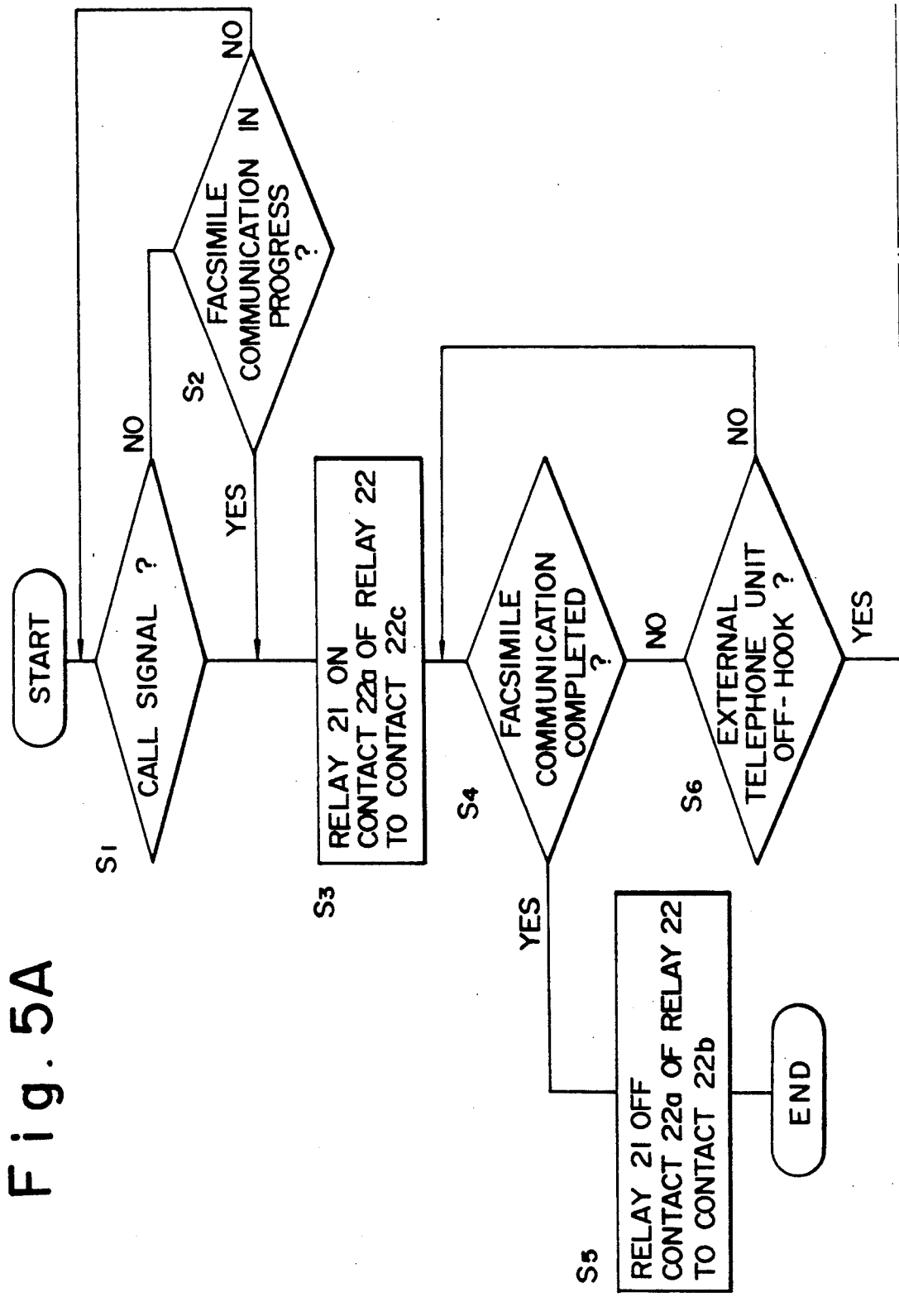
FIGS. 5A and 5B, when combined as shown in FIG. 5, define a flow chart showing a sequence of steps of an off-hook response process.
Figure 5B:
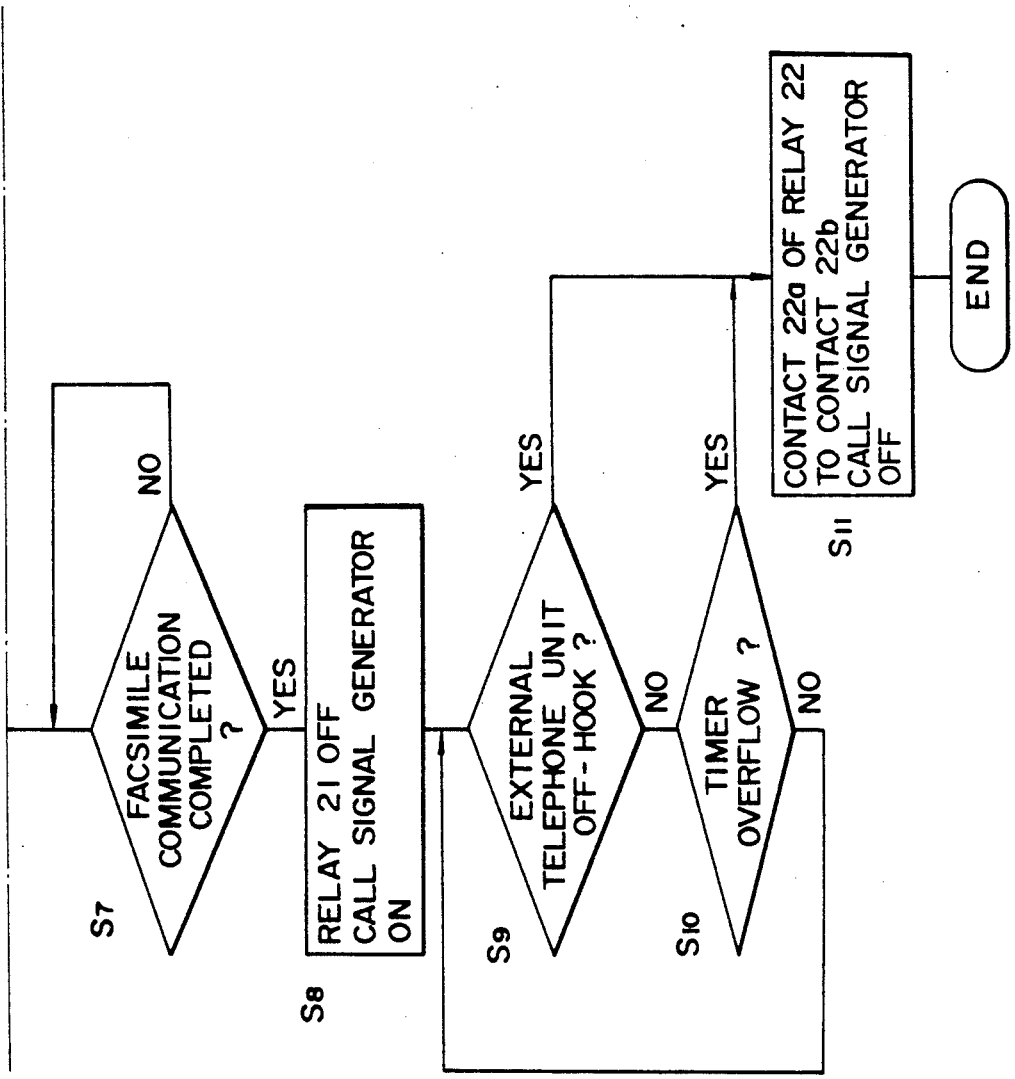

Referring now to FIG. 1, there is schematically shown a communication control system constructed in accordance with one embodiment of the present invention. As shown, the illustrated system includes a facsimile machine 1 which comprises a facsimile main body 1a, an original table 2 and a control panel (or operating unit) 3. An external telephone unit 4 is operatively and electrically connected to the facsimile machine 1, and the telephone unit 4 includes a telephone main body 4a and a handset 4b provided with a telephone receiver and a telephone transmitter. The original table 2 is a table on which a plurality of originals (not shown) may be placed in the form of a stack one on top of another. The control panel 3 is provided with various keys and switches, such as a start key, numeric keys, a copy key and control switches, and various display sections, and various command signals may be supplied to various components of the facsimile machine 1 therefrom.

As shown in FIG. 2, the facsimile machine 1 includes an original reading unit 11, a recording unit 12, an A/D converter 13, a buffer memory 14, a data compression/decompression circuit 15, a MODEM 16, a net control circuit 17, a control circuit 18 and the operating unit (control panel) 3. The original reading unit 11 is provided with a line image sensor (not shown) and a means (not shown for transporting an original to be read relative to the line image sensor, and thus a plurality of originals stacked on the original table 2 are fed one by one by the transporting means relative to the line image sensor, whereby the original information of each of the originals is optically read by the line image sensor line by line to thereby convert the optical image information into an electrical image signal which is then supplied to the A/D converter 13.

The A/D converter 13 converts an analog signal into a digital signal so that each line of analog image information output from the original reading unit 11 is converted into a corresponding digital image signal. The buffer memory 14 stores the image data digitized by the A/D converter 13 of the image information from the original reading unit 11 line by line and supplies the image data to the data compression/decompression circuit 15. At the circuit 15, the image data is compressed by coding during transmission mode and the data received from a transmitter is decompressed by decoding to restore the original image data during reception mode.

The MODEM 16 modulates the image data after having been compressed by the circuit 15 so as to transmit the thus compressed image data to a receiver at a remote place through an external transmission line, such as a telephone network, and the image data received from a transmitter at a remote place through an external transmission line is demodulated to extract a digital image signal. The net control unit 17 is of the type which is often referred to as AA-NCU, and, thus, it places a call to a destination automatically and receives a call from a transmitter at a remote place automatically. The control circuit 18 is typically comprised of a CPU, a ROM, a RAM and the like and it is in charge of the overall control of the present facsimile machine 1 based on command signals from the operating unit 3, detection signals from various sensors (not shown) provided in the facsimile machine 1, and a call signal sent from a transmitter at a remote place through an external transmission line.

The recording unit 12 typically includes a thermal printhead, transporting means for transporting a sheet of recording paper, an ink sheet and a sheet of recording paper, and ar image is recorded on a sheet of recording paper based of image information input from the buffer memory 14 and control signals. As shown in FIG. 3, the net control circuit 17 includes relays 21 and 22, off-hook detectors 23 and 24, a call signal detector 25, a call signal generator 26, a transformer 27 and a capacitor 28, and the net control circuit 17 is electrically connected to a pair of external transmission lines $L_1$ and $L_2$ and also to the telephone unit 4.

The relay 21 is turned on/off to have the external transmission lines $L_1$ and $L_2$ connected to or disconnected from the MODEM 16 which constitutes part of the facsimile machine 1. When the relay 22 takes a first state in which its common movable member 22a is connected to a first contact 22b, the telephone unit 4 is connected to the external lines $L_1$ and $L_2$, and when the member 22a is connected to a second contact 22c, the telephone unit 4 is connected to the call signal generator 26. These relays 21 and 22 are operated in accordance with control signals supplied from the control circuit 18. The off-hook detectors 23 and 24 detect the presence and absence of an off-hook state of the telephone unit 4 depending on a change of current flowing through the net control circuit 17 and a detected result is supplied to the control circuit 18 The call signal detector 25 detects a call signal supplied from the external transmission lines $L_1$ and $L_2$ and a detected result is supplied to the control circuit 18. The call signal generator 26 is driven by a drive signal supplied from the control circuit 18 to thereby output a call signal to the telephone unit 4 through the capacitor 28 and the relay 22. The control circuit 18 outputs a drive signal to the call signal generator 26 and also another drive signal to a buzzer 29 to have the buzzer 29 activated to thereby produce a sound.

Thus, a combination of the net control circuit 17 and the control circuit 18 defines a communication control circuit which selectively connects one of the telephone unit 4 and its host apparatus, or facsimile machine 1 in the illustrated embodiment, to the external transmission lines $L_1$ and $L_2$ switchingly.

In operation, the first aspect of the present invention is characterized in a process when a request for conversation has been received from a source station at a remote place during data communication. Thus, this aspect of the present invention will first be described with reference to the flow chart shown in FIG. 4. When the facsimile machine 1 is in its initial state, the relays 21 and 22 of the net control circuit 17 take the conditions shown in FIG. 3 so that the relay 21 is off and the movable member 22a of the relay 22 is in contact with the first contact 22b. The facsimile machine 1 is in an automatic reception mode, and thus, when a call signal has been received from the external transmission lines $L_1$ and $L_2$ (step $P_1$), this calling signal is detected by the call signal detector 25 and a detected result is output to the control circuit 18. When the detection signal from the call signal detector 25 continues over a predetermined time period, the control circuit 18 determines that the operator is absent and then automatically enters into an automatic reception process. That is, the control circuit 18 supplies switch signals to the relays 21 and 22 to have the relay 21 turned on and have the movable member 22a of the relay 22 brought into contact with the second contact 22c (step $P_2$). As a result, the external lines $L_1$ and $L_2$ are disconnected from the telephone unit 4 and then connected to the MODEM 16, constituting part of the facsimile machine 1, through the transformer 27.

Under this condition, the facsimile machine 1 exchanges facsimile control signals with another facsimile machine at a remote place to thereby determine communication conditions, and, thereafter, communication of image information is carried out to effect an ordinary facsimile communication operation (step $P_3$). Then, it is checked whether or not a signal indicating a request for conversation has been received from the transmitter facsimile machine (step $P_4$), and if there is no such conversation request signal, the current facsimile communication is terminated upon completion of reception. On the other hand, if there has been such a conversation request signal, the control circuit 18 supplies drive signals to the call signal generator 26 and also to the buzzer 29 to activate the buzzer 29 and the call signal generator 26, so that a call signal is supplied to the telephone unit 4 through the capacitor 28 and the relay 22 (step $P_5$). Accordingly, the buzzer 29 of the facsimile machine 1 produces a predetermined sound and the telephone unit 4 produces a ringing sound. As a result, when the operator happens to be close to the facsimile machine, he or she will know that a request for conversation has been received by the sound produced by the buzzer 29; on the other hand, if the operator happens to be in the vicinity of the telephone unit 4, he or she will know the fact of receipt of a request for conversation by the ringing sound of the telephone unit 4.

Therefore, in accordance with this aspect of the present invention, the operator has an increased chance of knowing the receipt of a request for conversation sent from the transmitter facsimile machine. When the operator picks up the handset 4b of the telephone unit 4, i.e., establishing an off-hook state, in response to such a sound produced by the buzzer 29 of the facsimile machine 1 or the ringer of the telephone unit 4, he or she can talk to a person at the transmitter facsimile machine who transmitted the request for conversation. Described more in detail, when the operator picks up the handset 4b (step $P_6$) to establish an off-hook condition, this fact is detected by the off-hook detector 24 and a detected result is supplied to the control circuit 18. Upon receipt of an off-hook detection signal from the off-hook detector 24, the control circuit 18 outputs switch signals to the relays 21 and 22 to thereby have the relay 21 turned off and cause the movable member 22a of the relay 22 to contact its first contact 22a (step $P_7$). Accordingly, the telephone unit 4 comes to be operatively and electrically connected to the external transmission lines $L_1$ and $L_2$ so that conversation may be carried out using the telephone unit 4 (step $P_8$). Upon completion of conversation, when the handset 4b is returned to its rest position on the telephone main body 4a to establish an on-hook condition (step $P_9$), which is a negative status of off-hook condition, the telephone unit 4 is disconnected from the external transmission lines $L_1$ and $L_2$ to terminate communication.

In the above-described embodiment, a call signal has been received at step $P_1$. As an alternative, in the case where the facsimile machine 1 has placed a call to a facsimile machine at a remote place, a request for conversation may be similarly handled if such a request has been received during transmission operation.

Figure 5:
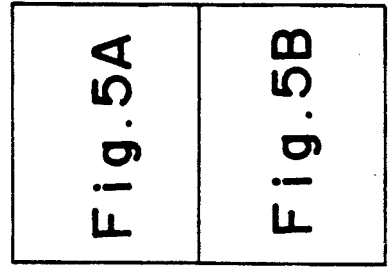
FIG. 5 is an illustration showing how to combine FIGS. 5A and 5B.

Now, another aspect of the present invention will be described with reference to FIG. 5. In accordance with this aspect of the present invention, when the handset 4b of the telephone unit 4 is picked up while the facsimile machine 1 is in operation and thus cannot place a call, a call signal is supplied to the telephone unit 4 upon completion of current operation of the facsimile machine 1 to apprise the operator of the fact that the operation of the facsimile machine 1 has been completed.

In operation, similarly with the previously described aspect of the present invention, in its initial condition, the relay 21 is in its off condition and the movable member 22a of the relay 22 is in contact with the first contact 22b. Under this condition, it is checked whether or not a call signal is received through the external transmission lines $L_1$ and $L_2$ and a facsimile communication operation is in progress (steps $S_1$ and $S_2$) If a call signal has been received or a facsimile communication operation is in progress, the relay 21 is turned on and the movable member 22a of the relay 22 is brought into contact with the second contact 22c (step $S_3$). Then, it is checked whether or not the facsimile communication operation has been completed by a signal from the off-hook detector 23 (step $S_4$), and upon completion of the facsimile communication operation, the relay 21 is turned off and the movable member 22a of the relay 22 is brought into contact with the first contact 22b to restore the initial condition (step $S_5$).

During facsimile communication (step $S_4$), it is checked whether or not the handset 4b of the telephone unit 4 has been picked up or off-hooked by the result of detection by the off-hook detector 24 (step $S_6$), and if it has not been off-hooked, it goes back to step $S_4$ to carry out a similar process to check whether or not the facsimile machine has been completed or the handset 4b has been off-hooked. When an off-hook condition has been detected at step $S_6$, it waits until the current facsimile communication operation is completed (step $S_7$), and, when completed, the relay 21 is turned off to have the MODEM 16 of the facsimile machine 1 disconnected from the external transmission lines $L_1$ and $L_2$ and at the same time have the call signal generator 26 activated to supply a call signal to the telephone unit 4 through the capacitor 28 and the relay 22 (step $S_8$). Then, it is checked whether or not the handset 4b of the telephone unit 4 is picked up or off-hooked within a predetermined time period by a timer (not shown) incorporated in the control circuit 18 and the off-hook detector 24 (steps $S_9$ and $S_{10}$). And, if it has been off-hooked or the predetermined time period has elapsed, the movable member 22a of the relay 22 is brought into contact with the second contact 22b and the call signal generator 26 is deactivated to terminate the outputting of a call signal (step $S_{11}$) to thereby terminate the present process.

Therefore, when the operator tried to place a call using the telephone unit 4 while the facsimile machine 1 was in communication operation and thus he or she could not place a call, upon completion of communication operator of the facsimile machine 1, a call signal is supplied to the telephone unit 4 to produce a ringing sound so that the operator at the telephone unit 4 can know that the telephone unit 4 is now available for placing a call through the external lines $L_1$ and $L_2$ Thus, in accordance with this aspect of the present invention, there is no need for the operator to go and check when the facsimile machine 1 will complete its current communication operation in order to use the telephone unit 4 for conversation and there is no need for the operator to pick up the handset 4b many times to determine the termination of the current communication operation by the facsimile machine 1. With this structure, even if the telephone unit 4 and the facsimile machine 1 share the same pair of external transmission lines $L_1$ and $L_2$, which are connected to a telephone network, there is no disadvantage in the usage of either of the telephone unit 4 and the facsimile machine 1.

It has been described as to the case where the host apparatus which shares the same external transmission line or lines with the telephone unit is a facsimile machine. As an alternative, such a host apparatus may include a personal computer having a communication function.

As described above, in accordance with the present invention, even if a request for conversation has been received while the present communication system is in communication operation, it is so structured that a call signal is supplied to the telephone unit upon completion of the current communication operation so that the operator may know the fact that a request for conversation has been received by the ringing sound of the telephone unit. Moreover, even if the operator could not place a call using the telephone unit of the present communication system because the associated facsimile machine was in communication operation, it is so structured that a call signal is supplied to the telephone unit upon completion of the current communication operation by the facsimile machine so that the operator can know that the telephone is now available for placing a call by hearing the ringing sound produced by the telephone unit. Therefore, even if the present communication system includes a telephone unit and a host apparatus, such as a facsimile machine or a personal computer having a communication function, both of which share the same external transmission line, there is virtually no disadvantage in using either of the telephone unit or the host apparatus.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A communication control system comprising:
   a telephone unit including a main body and a handset;
   a host apparatus having a communication function for carrying out communication of data with another host apparatus having a communication function at a remote place separate from said telephone unit; and
   net control means in said host apparatus for controlling a connection of said telephone unit and said host apparatus to a common external transmission line, whereby said control means selectively connects either one of said telephone unit and said host apparatus to said common external transmission line, said net control means automatically supplying a call signal to said telephone unit upon completion of a current communication operation, which is being carried out by said host apparatus, if an operator sets said telephone unit in an off-hook state in order to use said telephone to place a call to a remote destination, but could not, complete said call, because said current communication operation was in progress and further when the handset is in an off-hook arrangement to place a call to a first destination while said host apparatus is in a current communication operation with a second destination, said host unit detects the off-hook state of said telephone unit and upon completion of the current communication operation of the host system with said control means, said host unit sends a calling signal to said telephone unit upon completion of said current communication operation.

2. The system of claim 1, wherein said host apparatus includes a facsimile machine.

* * * * *